US008108837B2

(12) United States Patent
Heidloff et al.

(10) Patent No.: US 8,108,837 B2
(45) Date of Patent: Jan. 31, 2012

(54) ACCOMODATING DIFFERENT RESOLUTIONS OF REFERENCES TO COMPONENTS IN COMPOSITE APPLICATIONS

(75) Inventors: Niklas Heidloff, Salzkotten (DE); Thomas J. Calow, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 11/966,115

(22) Filed: Dec. 28, 2007

(65) Prior Publication Data

US 2011/0093480 A1    Apr. 21, 2011

(51) Int. Cl.
*G06F 9/44* (2006.01)
(52) U.S. Cl. .......................... 717/120; 717/169; 717/170
(58) Field of Classification Search .......................... None
See application file for complete search history.

(56) References Cited

U.S. PATENT DOCUMENTS

| | | | | |
|---|---|---|---|---|
| 6,697,849 B1 * | 2/2004 | Carlson | ......................... | 709/219 |
| 6,704,747 B1 * | 3/2004 | Fong | ......................... | 1/1 |
| 6,886,134 B1 * | 4/2005 | Cason | ......................... | 715/760 |
| 6,965,938 B1 * | 11/2005 | Beasley et al. | ......................... | 709/229 |
| 7,620,658 B2 * | 11/2009 | Benson et al. | ......................... | 1/1 |
| 7,774,791 B1 * | 8/2010 | Appelbaum et al. | ......................... | 719/318 |
| 2003/0033308 A1 * | 2/2003 | Patel et al. | ......................... | 707/10 |
| 2004/0034651 A1 * | 2/2004 | Gupta et al. | ......................... | 707/102 |
| 2004/0139141 A1 * | 7/2004 | Lessard | ......................... | 709/200 |
| 2005/0005261 A1 * | 1/2005 | Severin | ......................... | 717/108 |
| 2005/0065937 A1 * | 3/2005 | Degenaro et al. | ......................... | 707/100 |
| 2008/0270944 A1 * | 10/2008 | Balfe et al. | ......................... | 715/848 |

OTHER PUBLICATIONS

"Opening the Door to a Service Oriented Architecture," by Devlin, Barry. IN: IBM White Paper (Jan. 2006). Available at: ftp://ftp.lotus.com/pub/lotusweb/wplc/WPLC_SOA_white_paper.pdf Last visited: Sep. 21, 2011.*

* cited by examiner

*Primary Examiner* — Neveen Abel Jalil
*Assistant Examiner* — Daniel Kinsaul
(74) *Attorney, Agent, or Firm* — Ayla A. Lari; Hoffman Warnick LLC

(57) ABSTRACT

A core idea of present invention is not only to have one fixed link/reference to one specific database, but to use a script/formula (e.g. a Notes @formula/expression) that resolves to a link to a specific database at runtime. This allows pointing to different NSFs in the development environment vs. production environment vs. any other environment. This reference (e.g., the @formula/expression) is written in a new user interface (UI) of the Lotus Notes Composite Application Editor (CAE) that is part of the current UI to define component property preferences. This UI would generate the XML below so that users don't have to do this manually.

10 Claims, 3 Drawing Sheets

ACCOMODATING DIFFERENT RESOLUTIONS OF REFERENCES TO COMPONENTS IN COMPOSITE APPLICATIONS

FIELD OF THE INVENTION

The present invention generally relates to composite applications. Specifically, the present invention relates to an approach for accommodating different resolutions of references to components in composite applications.

BACKGROUND OF THE INVENTION

Composite Applications are collections of multiple components and component types brought together for a business purpose. They allow integrations of different technologies on the glass so that end users get all the tools and functions in one application they need to get their jobs done. Composite applications also allow the easy reuse of coarse grained components by using loosely coupled components that talk between each other via property broker and WSDL. Composite Applications are part of many software packages such as Lotus Notes 8.0 (Lotus, Notes and related terms are trademarks of IBM Corp. in the United States and/or other countries).

In composite application definitions (CA XML) you define the links to components. NSF (e.g., Lotus Notes-based) component links have currently a link to certain design elements in a specific NSF. For example: Notes://serverName/replicaId/AllDocs?OpenView The problem with these links is that they point to a specific server and a specific database. However developers usually implement a composite application and the components in a development environment first. After this has been completed and tested successfully, the composite application (e.g., one NSF) and the components (e.g., other NSFs) are deployed to other environments.

There are different ways to deploy NSFs to servers: 1. replicate, 2. copy per file system, 3. create copy of db, etc. In some of these cases the replica ids of the component NSFs change. In any case the server changes. Even though the server is only a hint and Notes looks for other servers automatically, the server attribute in the Notes URL should be the real server to which the application was deployed since Notes failover does not always work in complex networks. Even if it always worked it would take a lot of time to locate the right server first which would not be tolerable in terms of the user experience.

In view of the foregoing, there exists a need for an approach that solves at least one of the deficiencies in the related art.

SUMMARY OF THE INVENTION

A core idea of present invention is not only to have one fixed link/reference to one specific database, but to use a script/formula (e.g. a Notes @formula/expression) that resolves to a link to a specific database at runtime. This allows pointing to different NSFs in the development environment vs. production environment vs. any other environment. This reference (e.g., the @formula/expression) is written in a new user interface (UI) of the Lotus Notes Composite Application Editor (CAE) that is part of the current UI to define component property preferences. This UI would generate the XML below so that users don't have to do this manually.

At runtime when the Notes container ViewPart is triggered to show the NSF component, the container will run the script. For NSF based composite applications it will run this formula in the context of the NSF that contains the CA XML (definition of application). This formula needs to return a Notes URL to a specific database including the server. An efficient implementation of this formula could be to use Notes profile documents that contain this information. So customers could define the links for their different environments directly in that database or do lookups to other databases or storage facilities. The database component 'types' that are returned by the formula need to always have the same type. They need to contain the same WSDL (definition of properties and actions needed for inter component communication) and need to publish the same properties and provide the same actions. This prevents the wiring between different components from breaking.

A first aspect of the present invention provides a method for accommodating different resolutions of references to components in composite applications, comprising: providing a composite application stored in a first storage unit; providing a set of references in the first storage unit that map to a set of components, each stored in its own storage unit, the set of components being used by the composite application; and the set of references comprising expressions that execute in a context of the first storage unit, and that can access a current execution context and stored data to return a fully qualified component reference.

A second aspect of the present invention provides a method for accommodating different resolutions of references to components in composite applications, comprising: accessing a set of references in a first storage unit that map to a set of components, each stored in its own storage unit that is separate from the first storage unit, the set of components being used by a composite application also stored in the first storage unit; and the set of references comprising expressions that execute in a context of the first storage unit, and that can access a current execution context and stored data to return a fully qualified component reference.

A third aspect of the present invention provides a system for accommodating different resolutions of references to components in composite applications, comprising: a set of references stored in a first storage unit, the set of references mapping to a set of components, each stored in its own storage unit separate from the first storage unit, the set of components being used by a composite application; and the set of references comprising expressions that execute in a context of the first storage unit, and that can access a current execution context and stored data to return a fully qualified component reference.

A fourth aspect of the present invention provides a system for accommodating different resolutions of references to components in composite applications, comprising: a module for accessing a set of references in a first storage unit that map to a set of components, each stored in its own storage unit that is separate from the first storage unit, the set of components being used by a composite application also stored in the first storage unit, the set of references comprising expressions that execute in a context of the first storage unit, and that can access a current execution context and stored data to return a fully qualified component reference; and a module for updating the set of references when a location of a storage unit containing a component associated with the set of references changes.

A fifth aspect of the present invention provides a program product stored on a computer readable medium for accommodating different resolutions of references to components in composite applications, the computer readable medium comprising program code for causing a computer system to: access a set of references in a first storage unit that map to a set of components, each stored in its own storage unit that is separate from the first storage unit, the set of components being used by a composite application also stored in the first storage unit, the set of references comprising expressions that execute in a context of the first storage unit, and that can access a current execution context and stored data to return a fully qualified component reference; and update the set of references when a location of a storage unit containing a component associated with the set of references changes.

A sixth aspect of the present invention provides a method for deploying a system for accommodating different resolutions of references to components in composite applications, comprising: providing a computer infrastructure being operable to: access a set of references in a first storage unit that map to a set of components, each stored in its own storage unit that is separate from the first storage unit, the set of components being used by a composite application also stored in the first storage unit, the set of references comprising expressions that execute in a context of the first storage unit, and that can access a current execution context and stored data to return a fully qualified component reference; and update the set of references when a location of a storage unit containing a component associated with the set of references changes.

A seventh aspect of the present invention provides a data processing system for accommodating different resolutions of references to components in composite applications, comprising: a memory medium having instructions; a bus coupled to the memory medium; and a processor coupled to the bus that when executing the instructions causes the data processing system to: access a set of references in a first storage unit that map to a set of components, each stored in its own storage unit that is separate from the first storage unit, the set of components being used by a composite application also stored in the first storage unit, the set of references comprising expressions that execute in a context of the first storage unit, and that can access a current execution context and stored data to return a fully qualified component reference, and update the set of references when a location of a storage unit containing a component associated with the set of references changes.

BRIEF DESCRIPTION OF THE DRAWINGS

These and other features of this invention will be more readily understood from the following detailed description of the various aspects of the invention taken in conjunction with the accompanying drawings in which.

Figure 1:
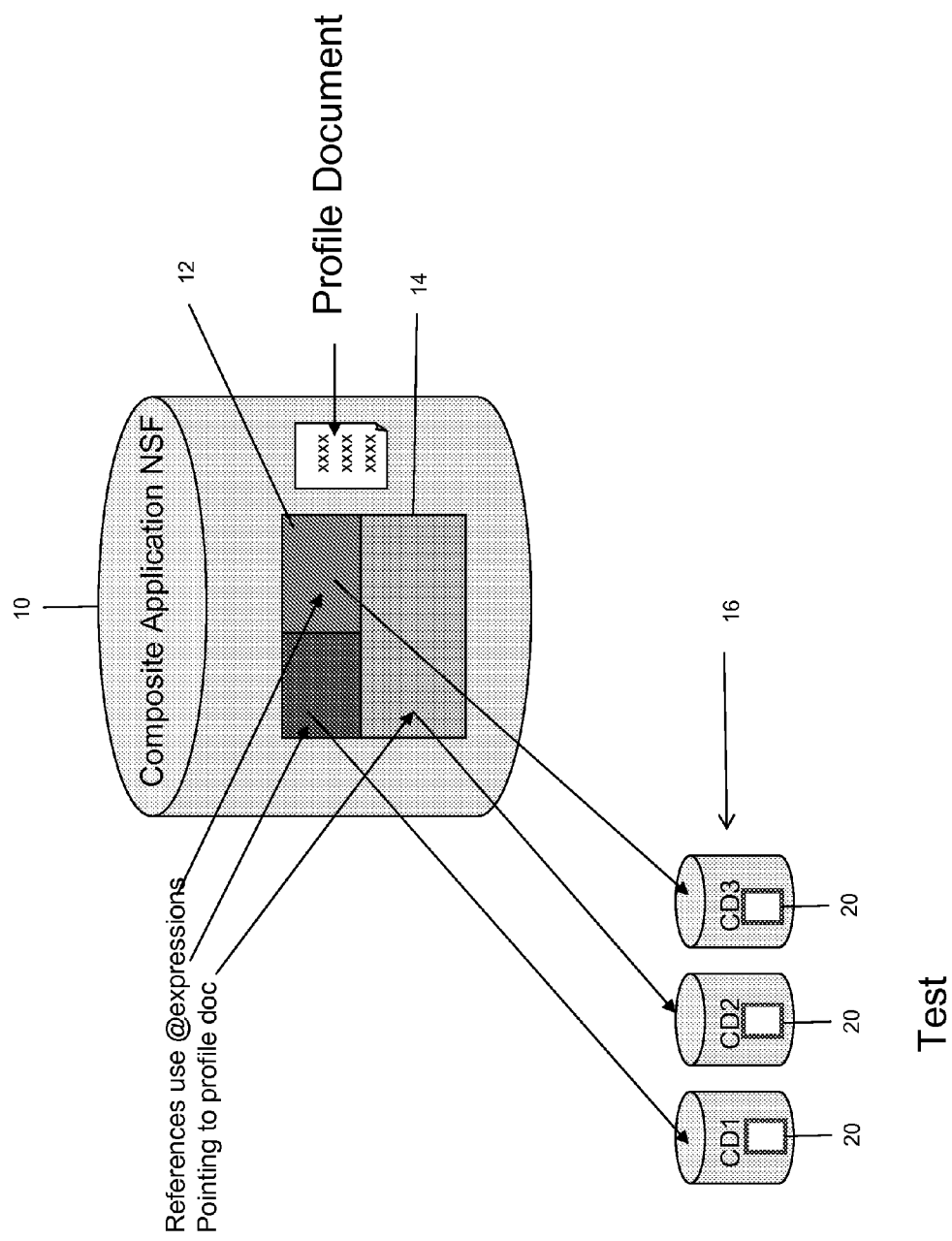
FIG. 1 depicts the addressing of components during testing/development according to one embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

A core idea of present invention is not only to have one fixed link/reference to one specific database, but to use a script/formula (e.g. a Notes @formula/expression) that resolves to a link to a specific database at runtime. This allows pointing to different NSFs in the development environment vs. production environment vs. any other environment. This reference (e.g., the @formula/expression) is written in a new user interface (UI) of the Lotus Notes Composite Application Editor (CAE) that is part of the current UI to define component property preferences. This UI would generate the XML below so that users don't have to do this manually.

At runtime when the Notes container ViewPart is triggered to show the NSF component the container will run the script. For NSF based composite applications it will run this formula in the context of the NSF that contains the CA XML (definition of application). This formula needs to return a Notes URL to a specific database including the server. An efficient implementation of this formula could be to use Notes profile documents that contain this information. So customers could define the links for their different environments directly in that database or do lookups to other databases or storage facilities. The database component 'types' that are returned by the formula need to always have the same type. They need to contain the same WSDL (definition of properties and actions needed for inter component communication) and need to publish the same properties and provide the same actions. This prevents the wiring between different components from breaking.

Figure 2:
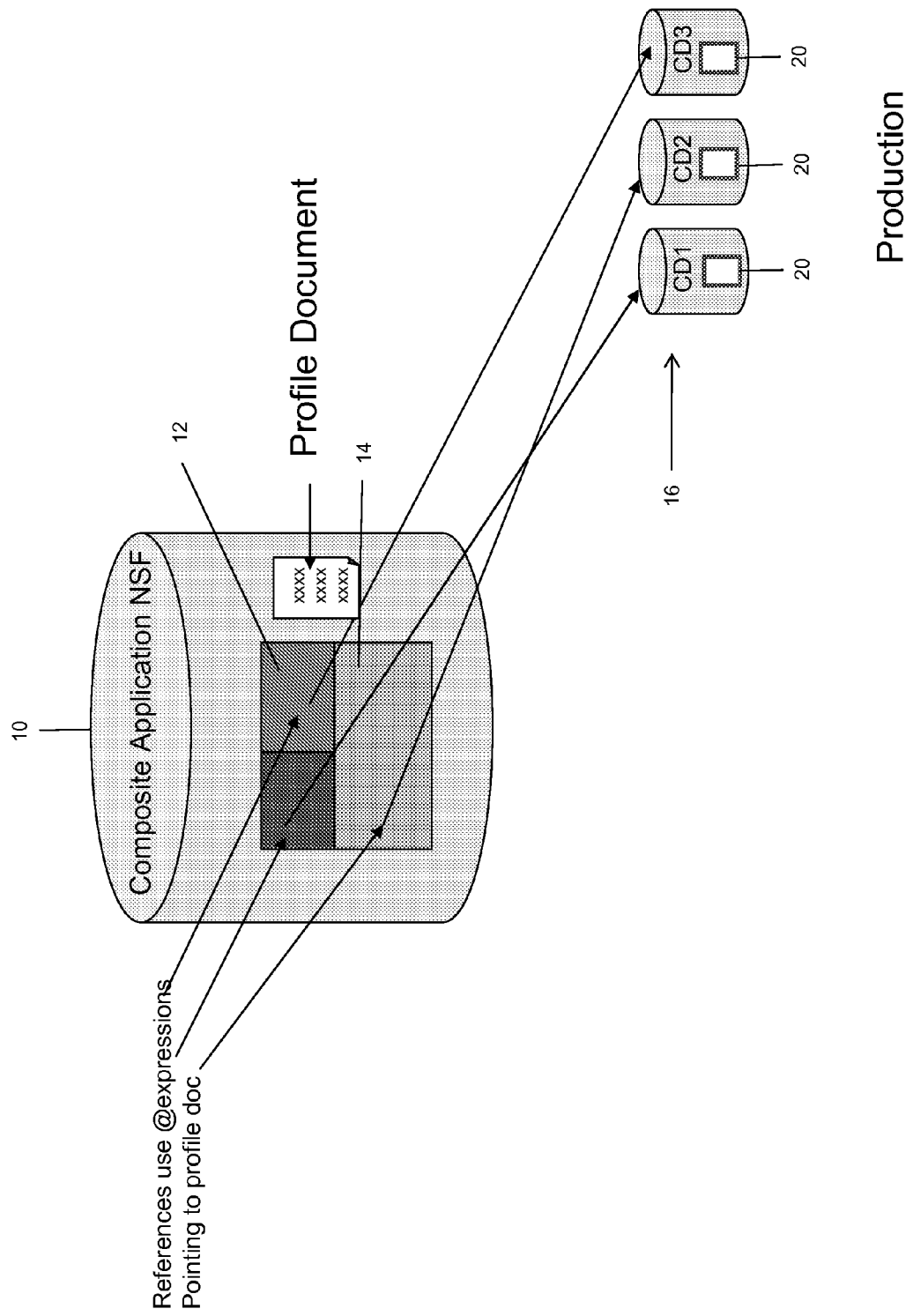
FIG. 2 depicts the addressing of components during production according to one embodiment of the present invention.

Referring now to FIGS. 1-2, these concepts will be explained in greater detail. As shown, FIGS. 1 and 2 include a composite application database 10, and a set (e.g., at least one) of component databases 16. FIG. 1 shows component databases 16 in one location during testing/development, while FIG. 2 shows component databases 16 at a different location during production. Composite application database 10 stores a composite application definition 14 (CA XML), a set of references, and a profile document. Components 20 used by composite application 14 can each be stored in its own, separate storage unit. Set of references 12 comprise expressions that execute in a context of the composite application storage unit 10, and that can access a current execution context and stored data to return a fully qualified component reference. In general, set of references 20 are configured to reference stored data that allow for: updating the stored data as needed to reflect any change in location of the storage units containing the set of components 20 (e.g., from test to production); and using the set of references to access the set of components. Under the current invention, the expressions from the set of references result in location information for the set of components. The set of references are typically, realized as a script that execute/run at runtime.

Below is a fragement of the CA XML as it is used now:

```
<portlet-definition id="TMP_10005">
    <preference name="notesurl">
        <base:value readOnly="false" required="false"
value="notes://server/8437837383938272/All+by+Company?OpenView"
xsi:type="base:String"/>
    </preference>
    ...
</portlet-definition>
```

Customers could still use this static link or they could use this new preference to define a Notes @Forumla:

```
<portlet-definition id="TMP_10005">
```

-continued

```
<preference name="dynamicnotesurl">
    <base:value readOnly="false" required="false" value="your @forumla code
that returns e.g. notes://server/8437837383938272/All+by+Company?OpenView"
xsi:type="base:String"/>
    </preference>
    ...
</portlet-definition>
```

The CAE could reuse the Domino Designer @Formula dialog as this is currently done for other Designer dialogs that are used in CAE as well.

Figure 3:
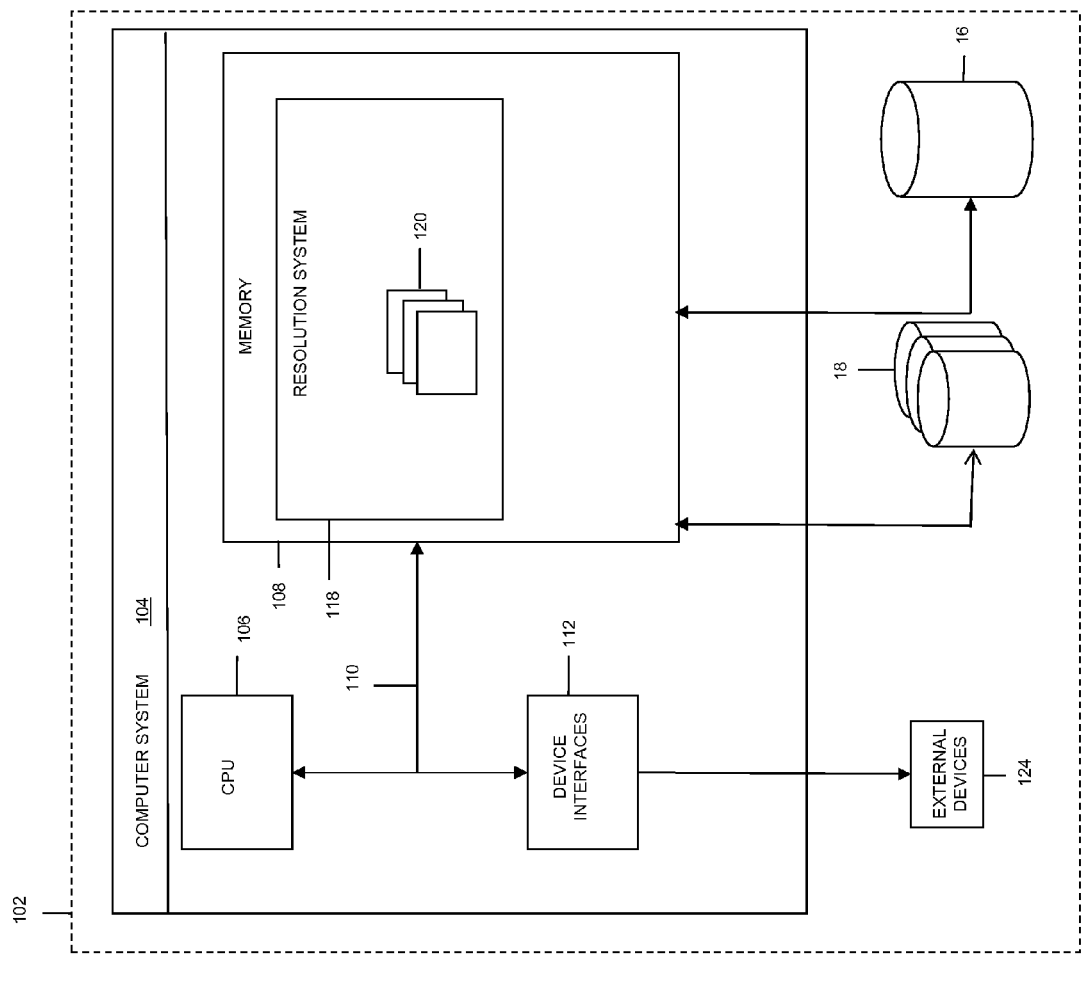
FIG. 3 a more specific computerized implementation according to the present invention.

There are NSF based comp apps and portal based comp apps. For portal based apps there is no NSF that contains the CA XML that can be used as the context to run the formula. So there need to be other options that are specified as composite application definition page level preferences:

1. On page level you can define a preference that links to a Notes db that is used to run the formula for all references on that page
2. Use any NSF component's database of the current page to run formula
3. Use current user's mail db
4. Use current user's contacts db II. Computerized Implementation Referring now to FIG. 3, a more detailed diagram of a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others, as indicated above As shown, computer system 104 includes a processing unit 106, a memory 108, a bus 110, and input/output (I/O) interfaces 112. Further, computer system 104 is shown in communication with external I/O devices/resources 124 and databases 16 and 18 (as discussed in conjunction with FIGS. 1 and 2). In general, processing unit 106 executes computer program code, resolution system 118, which is stored in memory 108 and/or storage systems 16 or 18. While executing computer program code, processing unit 106 can read and/or write data to/from memory 108, databases 16 and 18, and/or I/O interfaces 112. Bus 110 provides a communication link between each of the components in computer system 104. External devices 124 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the process(es) of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or databases 16 and 18 can comprise any combination of various types of data storage and/or transmission media that reside at one or more physical locations. Further, I/O interfaces 112 can comprise any system for exchanging information with one or more external device 124. Still further, it is understood that one or more additional components (e.g., system software, math co-processing unit, etc.) not shown in FIG. 3 can be included in computer system 104. However, if computer system 104 comprises a handheld device or the like, it is understood that one or more external devices 124 (e.g., a display) and/or storage systems 16 and 18 could be contained within computer system 104, not externally as shown.

Databases 16 and 18 can be any type of system (e.g., a database) capable of providing storage for information under the present invention. To this extent, Databases 16 and 18 could include one or more storage devices, such as a magnetic disk drive or an optical disk drive. In another embodiment, Databases 16 and 18 include data distributed across, for example, a local area network (LAN), wide area network (WAN) or a storage area network (SAN) (not shown). In addition, although not shown, additional components, such as cache memory, communication systems, system software, etc., may be incorporated into computer system 104. It should be understood computer system 104 could be any combination of human, hardware and/or software. It is shown as such to illustrate the functions as described herein.

Shown in memory 108 of computer system 104 is resolution system 118 having services/components/modules 120. These items represent units of functionality that provide all functionality discussed above and represent the teachings of the present invention.

While shown and described herein as a resolution accommodation system, it is understood that the invention further provides various alternative embodiments. For example, in one embodiment, the invention provides a computer-readable/useable medium that includes computer program code to enable a computer infrastructure for providing a resolution management system. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage systems 16 and 18 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to method for providing a service-based content management system. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing a resolution accommodation system. In this case, a computer infrastructure, such as computer infrastructure 102 (FIG. 3), can be provided and one or more systems for performing the process of the invention can be obtained (e.g., created, purchased, used, modified, etc.) and deployed to computer infrastructure 102. To this extent, the deployment of a system can comprise one or more of: (1) installing program code on a computing device, such as computer system 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, it should be understood that Java-specific technology has been referenced herein only as one possible way to implement the teachings recited herein. Along these lines, the teachings of the present invention could be implemented using any programming language now known or later developed.

We claim:

1. A method for accommodating different resolutions of references to components in composite applications, the method comprising:

providing a composite application, including a plurality of Note Storage Format (NSF) components, stored in a first storage unit;

providing a first set of references in the first storage unit that map, respectively, to each of the plurality of NSF components in the composite application, wherein each of the plurality of NSF components is stored in its own storage unit, and the storage unit for each of the plurality of NSF components is included in at least one database, wherein the first set of references are accessible in a development environment configured to access a current execution context and stored data of the plurality of NSF components to return a fully qualified component reference; and providing a second set of references accessible in a run-time environment, the second set of references derived from the first set of references by a formula, the second set of references and the first set of references each providing access to the plurality of NSF components in a fully qualified manner in the distinct run-time environment and development environment, respectively, wherein the first set of references and the second set of references are configured to reference the stored data of the plurality of NSF components to allow:

updating of the stored data of the plurality of NSF components to reflect any change in a location of the storage units for each of the plurality of NSF components; and accessing the stored data of the plurality of NSF components in the development environment and the run-time environment, wherein the first set of references and the second set of references are realized as distinct scripts.

2. The method of claim 1, wherein the storage units storing the plurality of NSF components are shared between at least two of the plurality of NSF components.

3. The method of claim 1, further comprising running the distinct script for the second set of references at runtime.

4. A computer system comprising:
at least one computing device configured to accommodate different resolutions of references to components in composite applications by performing actions, including:
accessing a first set of references in a first storage unit that map, respectively, to each of a plurality of Note Storage Format (NSF) components, using the at least one computing device,
wherein each of the plurality of NSF components are stored in a unique storage unit, included in at least one database, each unique storage unit being separate from the first storage unit, and the plurality of NSF components being used by a composite application also stored in the first storage unit,
wherein the first set of references are accessible in a development environment configured to access a current execution context and stored data of the plurality of NSF components to return a fully qualified component reference;
accessing a second set of references in a run-time environment, the second set of references derived from the first set of references by a formula, the second set of references and the first set of references each providing access to the plurality of NSF components in a fully qualified manner in the distinct run-time environment and development environment, respectively,
wherein the first set of references and the second set of references are configured to reference the stored data of the plurality of NSF components to allow:
updating of the stored data of the plurality of NSF components to reflect any change in a location of the storage units for each of the plurality of NSF components; and
accessing the stored data of the plurality of NSF components in the development environment and the run-time environment; and
updating the first set of references and the second set of references in the first storage unit when the location of the storage unit containing each of the plurality of NSF changes,
wherein the first set of references and the second set of references are realized as distinct scripts.

5. A program product stored on a non-transitory computer readable medium for accommodating different resolutions of references to components in composite applications, the non-transitory computer readable medium storing program code for causing a computer system to:
access a first set of references in a first storage unit that map, respectively, to each of a plurality of Note Storage Format (NSF) components,
wherein each of the plurality of NSF components are stored in a unique storage unit, included in at least one database, each unique storage unit being separate from the first storage unit, and the plurality of NSF components being used by a composite application also stored in the first storage unit,
wherein the first set of references are accessible in a development environment configured to access a current execution context and stored data of the plurality of NSF components to return a fully qualified component reference;
access a second set of references in a run-time environment, the second set of references derived from the first set of references by a formula, the second set of references and the first set of references each providing access to the plurality of NSF components in a fully qualified manner in the distinct run-time environment and development environment, respectively,
wherein the first set of references and the second set of references are configured to reference the stored data of the plurality of NSF components to allow:
updating of the stored data of the plurality of NSF components to reflect any change in a location of the storage units for each of the plurality of NSF components; and
accessing the stored data of the plurality of NSF components in the development environment and the run-time environment; and
update the first set of references and the second set of references in the first storage unit when the location of the storage unit containing each of the plurality of NSF components changes,
wherein the first set of references and the second set of references are realized as distinct scripts.

6. The program product of claim 5, further comprising running the distinct script for the second set of references at runtime.

7. The method of claim 1, wherein the second set of references accessed in the run-time environment are accessible via a user interface (UI) of a Notes Composite Application Editor.

8. The method of claim 1, wherein the first set of references provides a link for locating each of the plurality of NSF components while in the development environment, and the formula for deriving the second set of references from the first set of references includes the link provided by the first set of references, for providing access to each of the plurality of NSF components while in the run-time environment.

9. The computer system of claim 4, wherein the storage units storing the plurality of NSF components are shared between at least two of the plurality of NSF components.

10. The computer system of claim 4, wherein the at least one computing devices is further configured to perform actions comprising running the distinct script for the second set of references at runtime.

* * * * *